(12) United States Patent
Fitzpatrick et al.

(10) Patent No.: US 7,508,616 B2
(45) Date of Patent: Mar. 24, 2009

(54) REGULATING DATA WRITES RESPONSIVE TO HEAD FLY HEIGHT

(75) Inventors: Jim Fitzpatrick, Sudbury, MA (US); Jihao Luo, Shresbury, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/744,554

(22) Filed: May 4, 2007

(65) Prior Publication Data

US 2007/0268613 A1 Nov. 22, 2007

Related U.S. Application Data

(60) Provisional application No. 60/747,636, filed on May 18, 2006, provisional application No. 60/747,598, filed on May 18, 2006.

(51) Int. Cl.
*G11B 21/02* (2006.01)
*G11B 27/06* (2006.01)
*G11B 15/04* (2006.01)

(52) U.S. Cl. .............................. 360/75; 360/31; 360/60

(58) Field of Classification Search ........................ None
See application file for complete search history.

(56) References Cited

U.S. PATENT DOCUMENTS

| | | | | |
|---|---|---|---|---|
| 5,991,113 A * | 11/1999 | Meyer et al. | ................... | 360/75 |
| 6,999,256 B2 * | 2/2006 | Kim et al. | ...................... | 360/31 |
| 7,023,645 B1 * | 4/2006 | Emo et al. | ...................... | 360/75 |
| 7,212,361 B1 * | 5/2007 | Pederson et al. | .............. | 360/31 |
| 7,215,495 B1 * | 5/2007 | Che et al. | ....................... | 360/31 |
| 7,280,305 B2 * | 10/2007 | Kwon et al. | ................... | 360/75 |
| 7,292,401 B2 * | 11/2007 | Shen et al. | ...................... | 360/69 |
| 7,312,944 B2 * | 12/2007 | Takahashi et al. | .............. | 360/75 |
| 7,385,778 B2 * | 6/2008 | Kakiki | ......................... | 360/75 |
| 2007/0188908 A1 * | 8/2007 | Kurita et al. | ................... | 360/75 |

\* cited by examiner

*Primary Examiner*—K. Wong
(74) *Attorney, Agent, or Firm*—Myers Bigel Sibley & Sajovec, P.A.

(57) ABSTRACT

Write commands through a read/write head are regulated in response to head fly height. The head fly height is determined, and the rate at which the write command is carried out is regulated in response to the determined fly height. The rate may be regulated by inserting write inhibit gaps between writing data segments of the write command so as to allow the head to cool and, thereby, control fly height.

17 Claims, 6 Drawing Sheets

REGULATING DATA WRITES RESPONSIVE TO HEAD FLY HEIGHT

RELATED APPLICATION

This application claims the benefit of and priority to U.S. Provisional Patent Application No. 60/747,636, filed May 18, 2006, and to U.S. Provisional Patent Application No. 60/747,598, filed May 18, 2006, the disclosures of which are hereby incorporated herein by reference as if set forth in their entirety.

FIELD

The present invention generally relates to sensor clearance control and, more particularly, to controlling fly height of a read/write head in a data storage device.

BACKGROUND

Data storage devices, such as disk drives, allow host computers to store and retrieve large amounts of digital data in a fast and efficient manner. A typical disk drive includes a plurality of magnetic recording disks which are mounted to a rotatable hub of a spindle motor and rotated at a high speed. An array of read/write heads is disposed adjacent to data storage surfaces of the disks to transfer data between the disks and a host computer. The heads can be radially positioned over the disks by a rotary actuator and a closed loop servo system, and can fly in close proximity to the surfaces of the disks upon air bearings. The heads each typically contain a separate read element and write element.

Higher data storage density on the disks may be obtained by reading and writing data on narrower tracks on the disks and by maintaining a corresponding smaller fly height gap between the heads and the data storage surfaces. The fly height of a head can vary in response to air density changes in the disk drive, and in response to head temperature variations, such as while writing, which can affect the distance that the tip of the head protrudes therefrom (i.e., pole-tip protrusion). Some disk drives use a heater to controllably heat the head in order to vary the fly height of the head.

Maintaining the head fly height within an acceptable range is becoming increasingly difficult as that range is reduced to obtain higher data storage densities. Operation outside the acceptable range may result in an unacceptable read/write bit error rate and/or undesirable contact between a head and a data storage surface and potential loss of data and/or damage to the data storage surface.

SUMMARY

As data is written, the head is heated by the write current and it's temperature can continue to rise as data is written. Increased head temperature can cause decreased fly height due to, for example, increasing pole-tip-protrusion into the head-to-disk gap. If head heating during writing is not controlled, head fly height may become insufficient to avoid contact between the head and the disk and/or may cause written data to be corrupted.

In accordance with some embodiments, a write command can be regulated to attempt to maintain head fly height within an acceptable range. The fly height of the head can be determined and the rate at which a write command is carried out can be regulated in response to the determined fly height.

DETAILED DESCRIPTION

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will convey the scope of the invention to those skilled in the art. The terminology used in the detailed description of the particular exemplary embodiments illustrated in the accompanying drawings is not intended to be limiting of the invention.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the terms "and/or" and "/" include any and all combinations of one or more of the associated listed items. It will be understood that, although the terms first, second, etc. may be used herein to describe various steps, elements and/or regions, these steps, elements and/or regions should not be limited by these terms. These terms are only used to distinguish one step/element/region from another step/element/region. Thus, a first step/element/region discussed below could be termed a second step/element/region without departing from the teachings. Like numbers refer to like elements throughout the description of the figures.

The present invention may be embodied in hardware and/or in software (including firmware, resident software, microcode, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show what may be a primary direction of communication, it is to be understood that communication may occur in the opposite direction to the depicted arrows.

Figure 1:
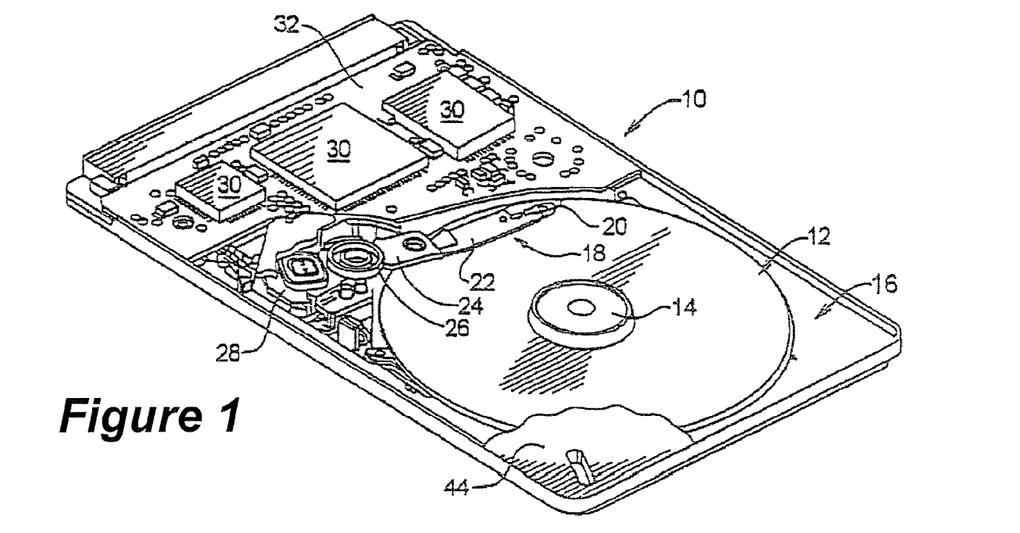
FIG. 1 is a perspective view of a disk drive with electronic circuits that are configured in accordance with some embodiments.
Figure 2:
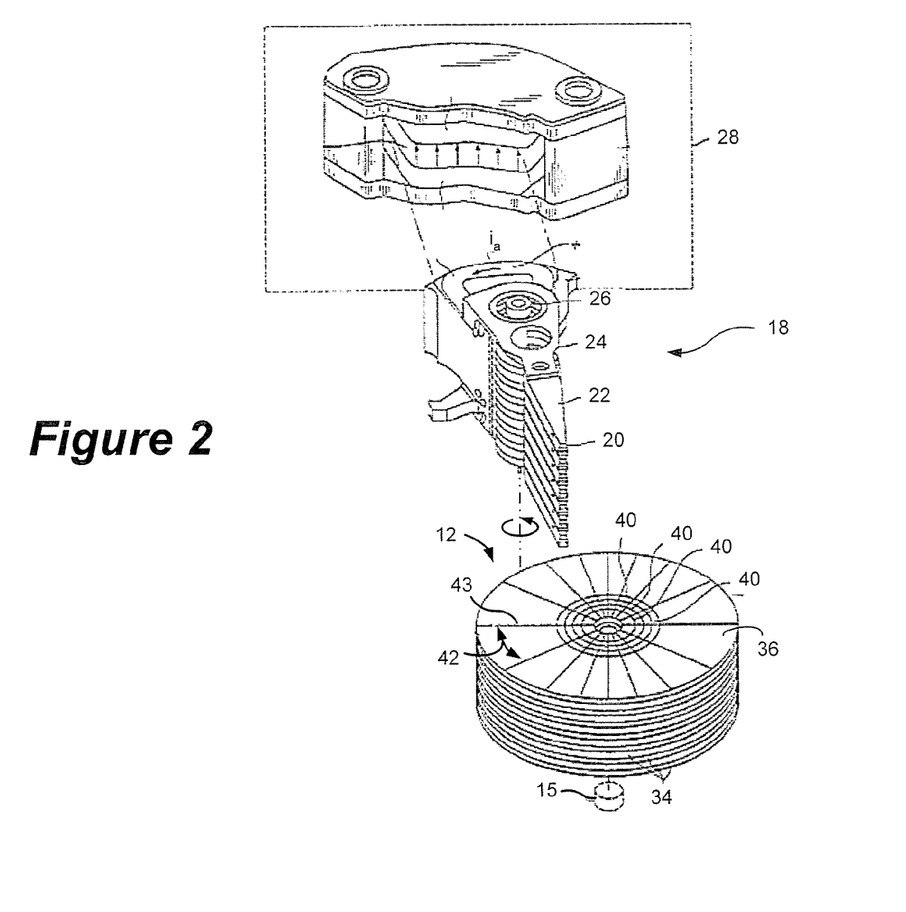
FIG. 2 is a block diagram of an exemplary head disk assembly of the disk drive.

A simplified diagrammatic representation of a disk drive, generally designated as 10, is illustrated in FIG. 1. The disk drive 10 includes a disk stack 12 (illustrated as a single disk in FIG. 1) that is rotated about a hub 14 by a spindle motor 15 (FIG. 2). The spindle motor 15 is mounted to a base plate 16. An actuator arm assembly 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 10.

The actuator arm assembly 18 includes a read/write head 20 (or transducer) mounted to a flexure arm 22 which is attached to an actuator arm 24 that can rotate about a pivot bearing assembly 26. The read/write head, or simply head, 20 may, for example, include a magnetoresistive (MR) element and/or a thin film inductive (TFI) element. The actuator arm assembly 18 also includes a voice coil motor (VCM) 28 which radially moves the head 20 across the disk stack 12. The spindle motor 15 and actuator arm assembly 18 are coupled to a controller, read/write channel circuits, and other associated electronic circuits 30 which are configured in accordance with at least one embodiment, and which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

Referring now to the illustration of FIG. 2, the disk stack 12 typically includes a plurality of disks 34, each of which may have a pair of disk surfaces 36. The disks 34 are mounted on a cylindrical shaft and are rotated about an axis by the spindle motor 15.

The actuator arm assembly 18 includes a plurality of the heads 20, each of which is positioned to be adjacent to a different one of the disk surfaces 36. Each head 20 is mounted to a corresponding one of the flexure arms 22. The VCM 28 operates to move the actuator arm 24, and thus moves the heads 20 across their respective disk surfaces 36. The heads 20 are configured to fly on an air cushion relative to the data recording surfaces 36 of the rotating disks 34 while writing data to the data recording surface responsive to a write command from a host device or while reading data from the data recording surface to generate a read signal responsive to a read command from the host device.

FIG. 2 further illustrates tracks 40 and spokes 43 on the disks 34. Data is stored on the disks 34 within a number of concentric tracks 40 (or cylinders). Each track 40 is divided into a plurality of radially extending sectors 42 separated by radially extending spokes 43. Each sector is further divided into a servo sector and a data sector. The servo sectors of the disks 34 are used, among other things, to accurately position the head 20 so that data can be properly written onto and read from a selected one of the disks 34. The servo sectors may include a DC erase field, a preamble field, a servo address mark field, a track number field, a spoke number field, and a servo burst field (e.g., circumferentially staggered and radially offset A, B, C, D servo bursts). The data sectors are where data received as part of a host-initiated write command is stored, and where data can be read in response to a host-initiated read command.

Figure 3:
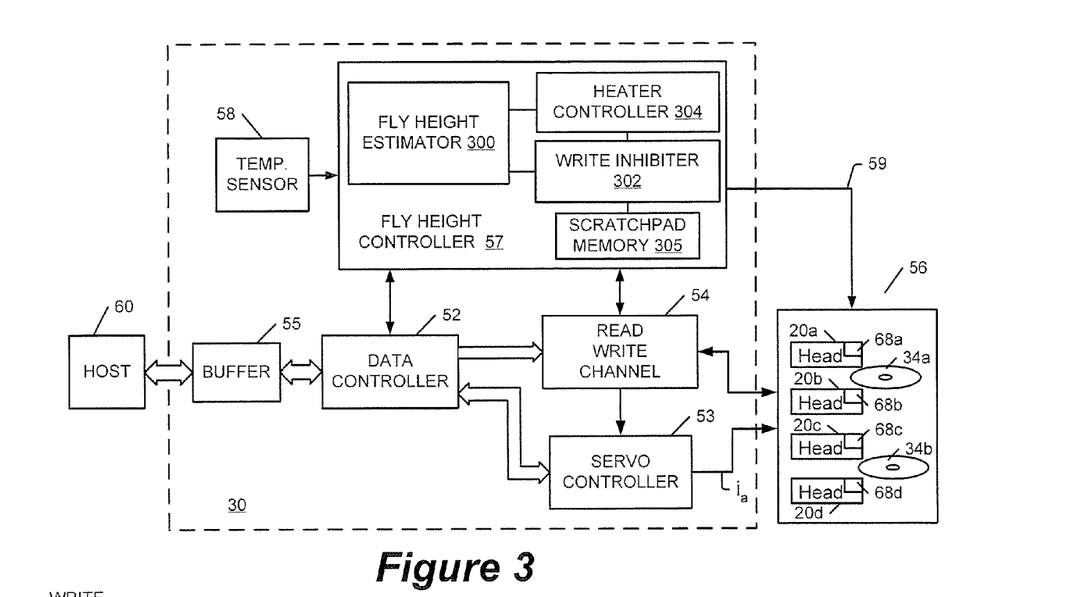
FIG. 3 is a block diagram of a portion of the controller of the disk drive shown in FIG. 1 and associated methods that are configured in accordance with some embodiments.

FIG. 3 is a block diagram of a host device 60 that is communicatively connected to a portion of the controller 30 of the disk drive 10 shown in FIG. 1 according to some embodiments. The controller 30 can include a data controller 52, a servo controller 53, a read write channel 54, a buffer 55, a fly height controller 57, and an air temperature sensor 58. Although the controllers 52, 53, and 57, the buffer 55, and the read write channel 54 have been shown as separate blocks for purposes of illustration and discussion, it is to be understood that their functionality described herein may be integrated within a common integrated circuit package or distributed among more than one integrated circuit package. The head disk assembly (HDA) 56 can include a plurality of the disks 34a-b, a plurality of the heads 20a-d mounted to the actuator arm assembly 18 and positioned adjacent to different data storage surfaces of the disks 34a-b, the VCM 28, and the spindle motor 15. In general, there may be two heads 20 per disk 34. Thus, in a 4-disk platter drive, there may be eight heads 20.

Write commands and associated data from the host device 60 are buffered in the buffer 55. The data controller 52 is configured to carry out buffered write commands by formatting the associated data into blocks with the appropriate header information, and transferring the formatted data from the buffer 55, via the read/write channel 54, to logical block addresses (LBAs) on the disk 34 identified by the associated write command.

The read write channel 54 can operate in a conventional manner to convert data between the digital form used by the data controller 52 and the analog form of a write current conducted through a selected head 20 in the HDA 56. The read write channel 54 can operate in a conventional matter to convert the analog signal from a head in HDA 56 to a sequence of ones and zeros which are passed on to the data controller 52. The read write channel 54 provides servo positional information read from the HDA 56 to the servo controller 53. The servo positional information can be used to detect the location of the head 20 in relation to LBAs on the disk 34. The servo controller 53 can use LBAs from the data controller 52 and the servo positional information to seek the head 20 to an addressed track and block on the disk 34, and to maintain the head 20 aligned with the track while data is written/read on the disk 34.

When a head 20 is selected for reading/writing, its fly height is typically above an acceptable flight height range where the head 20 should/must be located when reading/writing data on the disk 34. Accordingly, in response to selection of a head 20, the fly height controller 57 heats the head 20 using a heater element to lower the head fly height to within the acceptable range. Upon reaching the acceptable range, reading/writing may be carried out through the selected head 20.

In accordance with some embodiments, the fly height controller 57 includes a fly height estimator 300, a write inhibiter 302, and a heater controller 304. The fly height estimator 300 repetitively estimates the fly height of the head 20 relative to the disk 34 as data is written/read therefrom. The write inhibiter 302 selectively inhibits writing in response to the fly height estimates and, thereby, regulates the duty cycle of the amount of time that data it is substantially continuously written on the disk 34 to a time duration during which writing is inhibited. The heater controller 304 controls heating by a heater element that heats the head 20. The system regulates head heating by the heater controller 304 to drive the head 20 to within an acceptable fly height range and then attempts to maintain the head fly height within that range.

For example, in response to selection of the head 20 for writing, the fly height estimator 300 repetitively estimates head fly height as it regulates heating of the head to drive the fly height to within a range that is acceptable for writing. The fly height estimator 300 then continues to repetitively estimate head fly height and the fly height controller regulates head heating, in response to the estimates, in an attempt to maintain head fly height within the acceptable range while the head 20 is writing data, which may include a sequence of writing groups of data blocks with gaps between the data blocks.

The heater controller 304 controls head fly height by regulating the power that is provided to a heater element that heats a selected head. With reference to FIG. 3, the HDA 56 may include a plurality of heater elements 68*a-d* attached, or otherwise thermally connected, to different ones of the heads 20*a-d*. The heater controller 304 generates heater signal 59 which is conducted through the heater elements 68*a-d* to generate heat therefrom and, thereby, heat the heads 20*a-d*. The heater controller 304 regulates the height adjustment signal 59 to control heating of the heads 20*a-d* and cause a controlled amount of pole-tip-protrusion (thermally-induced elastic deformation) from the heads 20*a-d* and, thereby, control fly heights of the heads 20*a-d*.

Although one heater signal 59 has been shown in FIG. 3, and which may be used to separately control heating by different ones of the heater elements 68*a-d*, it is to be understood that more heater signals 59 may be used to control the heater elements 68*a-d* and that, for example, the heater elements 68*a-d* may be controlled by individual heater signals 59.

As data is written, the head 20 is heated by the write current and its temperature can continue to rise to higher levels as the length of data (e.g., the number of blocks) that is written substantially continuously on the disk 34 increases. As head temperature increases, head fly height can decrease due to, for example, increasing head pole-tip-protrusion. When gaps occur between writes, the head 20 can cool, causing decreased pole-tip-protrusion and corresponding increase in fly height. Accordingly, the head 20 can be subjected to abrupt temperature fluctuations, which, if left uncompensated, may result in abrupt changes in fly height.

The fly height estimator 300 can estimate the fly height for a selected head 20 (e.g., 20*a* or another one of the heads 20*b-d*) in response to air temperature, which may be sensed by a temperature sensor 58, and/or in response to air pressure, which may be sensed by a pressure sensor. The fly height estimator 300 can also estimate fly height of the selected head 20*a* in response to a level of heating of the selected head 20*a* by the heater elements 68*a*, length of a data segment last written through the head 20*a*, and/or in response to write duty cycle (i.e., ratio of writing time to total time) for writing a plurality of data segments (e.g., a plurality of data blocks) through the head 20*a* with gaps therebetween.

The fly height estimator 300 may also compensate for the head heating that will occur in the future as planned writes are carried out. For example, the fly height estimator 300 may determine the length of one or more data segments in the buffer 55 that are about to be written on the disk 34, and may estimate the effect of such writing on head fly height.

While data is being written/read, the fly height estimator 300 may generate a decreased fly height estimate in response to increased air temperature, increased heating by a heater element, and/or following writing of a longer data segment or increased write duty cycle (i.e., increased write power dissipation in the head 20 and associated increase in pole-tip-protrusion). Similarly, the fly height estimator 300 may generate an increased fly height estimate in response to decreased air temperature, decreased heating by the heater element, and/or increased gap between writes.

The fly height estimator 300 may periodically adjust (calibrate) its estimates of head fly height in response to fly height measurements carried out through the head 20*a-d*. The fly height measurements may be carried out by comparing the magnitude of a servo signal, which is generated by reading defined fields in the servo sectors using a selected head, or in other patterns read from a defined portion of the disk 34 to a known relationship between signal magnitude and head fly height.

Figure 4:
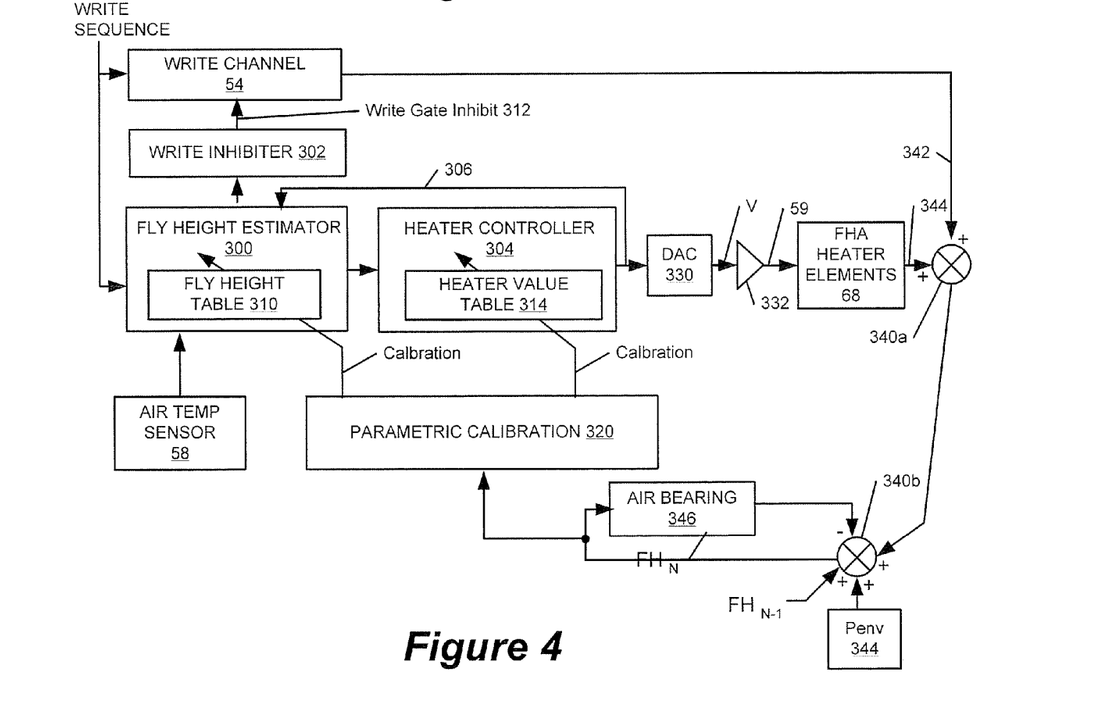
FIG. 4 is more detailed block diagram of the fly height controller of FIG. 3 and associated methods that are configured in accordance with some embodiments.

FIG. 4 is more detailed block diagram of the fly height controller 57 of FIG. 3 and associated methods that are configured in accordance with some embodiments. Referring to FIG. 4, the fly height estimator 300 can include a fly height table 310 of parametric values that define for each of the heads 20*a-d* an estimate of the head fly height when the head is subjected to a defined air temperature and/or air pressure, subjected to a level of heating from a corresponding one of the heater elements 68*a-d*, and/or subjected to a level of heating from writing a data segment having a defined length and/or writing at a certain duty cycle.

The parametric values of the fly height table 310 may be defined during the design of the disk drive 10 and/or may be calibrated during factory testing of the disk drive 10, the operations by which are collectively identified as parametric calibration 320. For example, the fly heights of the heads 20*a-d* may be individually measured during factory testing while the heads 20*a-d* are subjected to a range of air temperatures, subjected to a range of heating levels by the heater elements 68*a-d*, and/or subjected to a range of write current durations and/or write duty cycles. The fly height table 310 may be further calibrated during operation of the disk drive 10 in response to fly height measurements, such as described above by reading defined fields in the servo sectors or elsewhere on the disks 34*a-b*.

The fly height estimate by the fly height estimator 300 may be generated based on a combination of intermediate estimates, such as an estimate of head fly height at a sensed air temperature combined with an estimate of head pole-tip-protrusion from head heating by the heater element 68 and an estimate of head pole-tip-protrusion from writing data. The head fly height relative to a disk 34 may be determined by subtracting the summed estimates of head pole-tip-protrusion, due to heating by the heater element and writing through the head, from the estimate of head fly height at a particular air temperature (i.e., head pole-tip-protrusion decreases the head fly height gap at a particular air temperature).

For example, pole-tip-protrusion distance due to head heating while writing data may be repetitively estimated over a time increment k based on the following Equation 1:

$$PTP_W(k)=A_1(\alpha_1(1-e^{(-kT/\tau_1)})+(1-\alpha_1)(1-e^{(-kT/\tau_2)})), \quad \text{(Equation 1)}$$

where $PTP_W(k)$ represents the writing-induced head pole-tip-protrusion distance at time increment k, T represents a servo spoke location of the head 20, $A_1$ represents a calibrated amplitude of pole-tip-protrusion over an operable range of writing-induced heating, $\alpha_1$ represents the fraction of write pole tip protrusion with time constant $\tau_1$, and $\tau_1$ and $\tau_2$ are calibrated time constants that are indicative of the rate of change of pole-tip-protrusion in response to writing data through the head.

The pole-tip-protrusion distance due to head heating by the heater element 68 may be repetitively estimated over the time increment k based on the following Equation 2.

$$PTP_H(k)=A_2(\alpha_2(1-e^{(-kT/\tau_3)})+(1-\alpha_2)(1-e^{(-kT/\tau_4)})), \quad \text{(Equation 2)}$$

where $PTP_H(k)$ represents the heater-induced head pole-tip-protrusion distance at time increment k, T represents a servo spoke location of the head 20, $A_2$ represents a calibrated amplitude of pole-tip-protrusion over an operable range of heating by the heater element, $\alpha_2$ represents the fraction of heater induced protrusion associated with time constant $\tau_3$, and $\tau_3$ and $\tau_4$ are calibrated time constants that are indicative of the rate of change of pole-tip-protrusion in response to a heater signal applied to the heater element.

The time increment k at which the fly height estimates are updated may or may not correspond to an integer multiple of the servo spoke timing sensed by the read write channel 54. The length of the time increment k may be defined based on the rate of change of head fly height that the fly height estimator 300 is to track with its fly height estimates. Accordingly, the time increment k may be decreased (i.e., higher frequency of estimates) to, for example, track faster head temperature variations.

Accordingly, fly height estimator 300 utilizes the fly height table 310 (or other controller logic and/or algorithms) to dynamically estimate head fly height in response to present air temperature, level of heating by the heater element 68 (e.g., heater signal 306), length(s) of written data segment, and/or length of one or more upcoming writes. The fly height estimator 300 uses the fly height estimates to regulate heating by the heater controller 304 in an attempt to maintain the fly height of a selected head within an acceptable range. The write inhibiter 302 selectively inhibits writing by the write channel 54, via a write gate signal 312, when the estimated fly height is outside the acceptable range.

The heater controller 304 can include a heater value table 314 that translates the fly height estimates from the fly height estimator 300 into digital heater values 306. The digital heater values 306 are converted by a digital-to-analog converter (DAC) 330 into an analog voltage that is amplified by an amplifier 332 to generate a heater signal 59 that may be selectively conducted to one of the fly height adjust (FHA) heater elements 68a-d for a selected one of the heads 20a-d.

In FIG. 4, the fly height of a selected head depends upon the cumulative effects at summing node 340a of head heating by the write current 342 and the heat output 344 of the heater element. The fly height of the selected head also depends upon parameters which are not controlled by the fly height estimator 300, including environmental conditions 344, such as air temperature, humidity, pressure, the configuration of the slider portion of the head 20 which generates the air bearing 346, and the previous state of head fly height (indicated as $FH_{N-1}$).

Figure 5:
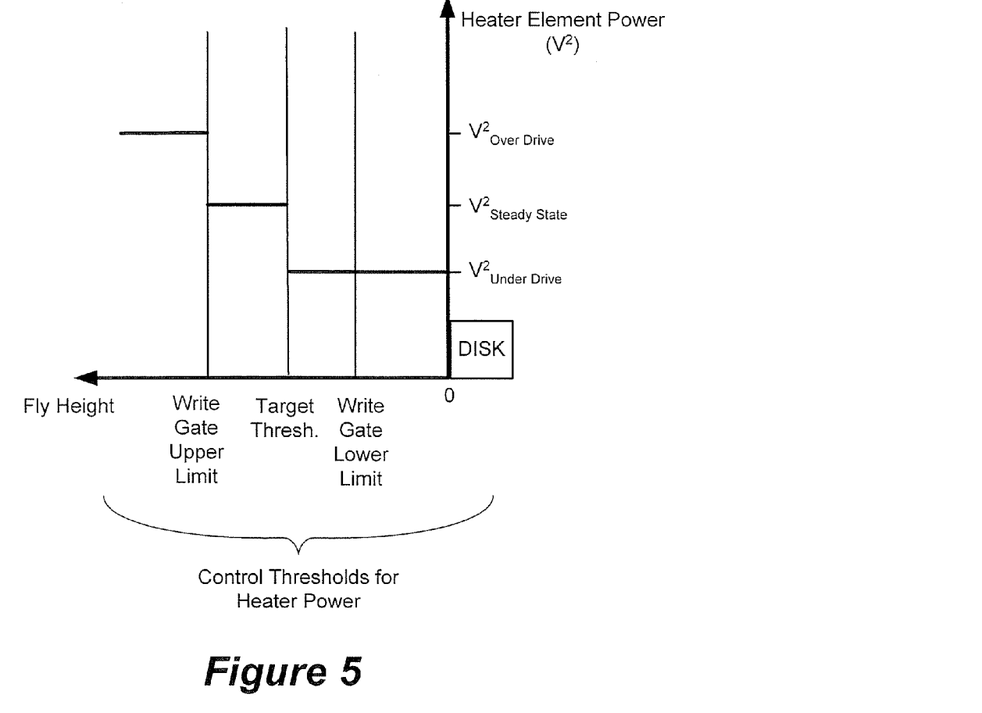
FIG. 5 shows a graph that illustrates methods and operation of the fly height controller of FIGS. 3 and 4 for regulating heater element power to attempt to obtain and maintain head fly height clearance within an acceptable range.

FIG. 5 is a graph that illustrates methods and operation of the fly height estimator 300, the write inhibiter 302, and the heater controller 304 of the fly height controller 57 of FIGS. 3 and 4 for regulating heater element power to obtain and maintain head fly height within an acceptable range. Referring to FIGS. 4 and 5, the fly height estimator 300 may regulate head heating by the heater element 68, i.e., regulate heater element power, which is proportional to $V^2$, based on a comparison of the estimated head fly height to various defined control threshold levels. When the estimated fly height is above a defined write gate upper limit, the write inhibiter 302 asserts to prevent data from being written via the write channel 54 through the head 20 and the heater controller 304 applies an over-drive level ("$V^2_{Over\ Drive}$") of power to the heater element 68, the level of which is calibrated to decrease head fly height rapidly towards the target threshold fly height.

When the estimated head fly height decreases below the write gate upper limit, the write inhibiter 302 de-asserts the write gate inhibit signal 312 to enable data to be written through the write channel 54 and the head 20, and the heater controller 304 applies a lower steady-state level ("$V^2_{Steady\ State}$") of heater power. As explained above, the head 20 is heated as data is written through it, and its fly height can decrease as the pole-tip-protrusion therefrom increases. While the estimated head fly height is between the write gate upper limit and the target threshold fly height, the heater controller 304 applies the steady-state level ("$V^2_{Steady\ State}$") of heater power. The steady state level ("$V^2_{Steady\ State}$") of heater power is calibrated to be a level that should maintain head fly height at the target threshold when not writing. The steady state level ("$V^2_{Steady\ State}$") is less than the over drive power level ("$V^2_{Over\ Drive}$").

When the estimated head fly height falls below the target threshold, the heater controller 304 further reduces the heater power level to an under-drive heater power level ("$V^2_{Under\ Drive}$") through the heater element 68. The lower heater power level $V^2$ ("$V^2_{Lower\ Target\ Threshold}$") is calibrated so as to attempt to cause the head fly height to return to the target threshold when write induced protrusion is present. The under-drive power level ("$V^2_{Under\ Drive}$") is less than the steady-state power level ("$V^2_{Steady\ State}$").

When the estimated head fly height falls below the write gate lower limit, the write inhibiter 302 asserts the write gate inhibit signal 312 to prevent data from being written via the write channel 54 through the head 20. With writing inhibited, the head 20 may sufficiently cool so that its estimated fly height increases sufficiently above the write gate lower limit so that the write gate can be de-asserted and writing may resume.

Referring again to FIG. 3, the fly height controller 57 may thereby regulate the rate of a write command by inhibiting writing through the head 20 for a duration that is controlled in response to the head fly height as estimated by the fly height estimator 300. For example, the flag controller 57 can suspend writing of data in the estimated fly height falls below the write gate lower limit and, thereby, cause data from a write command to be into at least first and second data segments that are separately written with a gap therebetween. The write inhibiter 302 may regulate the length of the write inhibit gap to cause the head 20 to partially cool after writing the first data segment so that the head fly height may increase a desired amount before the second data segment is written through the head 20.

Figure 6:
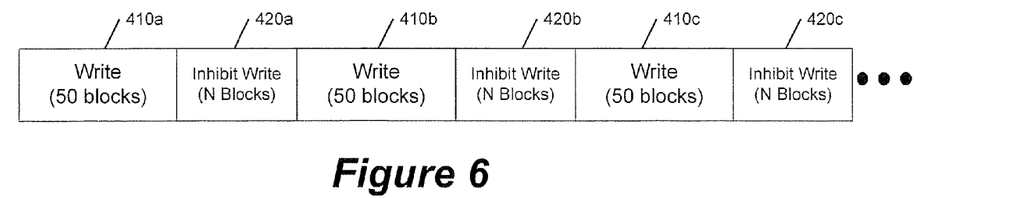
FIG. 6 is a block diagram that illustrates an approach for controlling head temperature by regulating the length of write inhibit time between data writes.

FIG. 6 is a block diagram that illustrates an approach for controlling head temperature by regulating the length of write inhibit time between data writes. Referring to FIG. 6, the write inhibiter 302 may cause the data controller 52 to divide data, which may be in buffer 55 and received from the host 60 as part of a write command, into a plurality of segments 410*a-c*. For purposes of illustration only, each of the data segments 410*a-c* are shown as being the same length (e.g., length of 50 logical blocks on the disk 34). The first data segment 410*a* is written on the disk 34 and then writing is inhibited for duration 420*a* (e.g., N blocks on disk 34) in response to the estimated head fly height becoming below the write gate lower limit. Following the write inhibit duration 420*a*, after which the head fly height is increased sufficiently above a write gate lower limit, the second data block 410*b* is written and then writing is inhibited for another duration 420*b* (e.g., N blocks). The third data block 410*c* is then written and writing is inhibited for another duration 420*c* (e.g., N blocks). Although the write inhibit durations 420*a-c* have been illustrated as having the same length, it is to be understood that their lengths may be different. For example, the write inhibit durations 420*a-c* may be dynamically regulated by the write inhibiter 302 so as to compensate for head heating and to maintain the head fly height within an acceptable range of the target threshold.

By way of further example, to compensate for writing induced heating of the head 20 when writing 400 blocks on a track having 1000 blocks, the write inhibiter 302 may limit writing to a 50% duty cycle by allowing blocks 1-10 to be written, inhibiting writing of blocks 11-20, allowing blocks 21-30 to be written, inhibiting writing of blocks 31-40, and so on along the track. The previously skipped blocks 11-20, 31-40, and so on along the track may then be subsequently written upon the disk revolving so that the head 20 is again positioned along those blocks.

Although the write inhibit durations 420*a-c* illustrated in FIG. 6 are shown as multiples of disk blocks, they are not limited thereto and may be any length. For example, the write inhibit gap may correspond to as little as a block or may correspond to one or more disk rotations (e.g., 1, 2, 3 disk revolutions). When the write inhibit duration corresponds to a disk rotation, then, following a write inhibit gap, instead of waiting for the disk 34 to continue to rotate until the head 20 is positioned over the addressed location from the write command, the data may be written to a scratchpad memory 305 by the write inhibiter 302. The scratchpad memory may be a semiconductor non-volatile memory (e.g., EEPROM, flash-EEPROM) where the data may be temporarily stored. The data may subsequently be copied from the scratchpad memory 305 to the addressed location on the disk 34 that is identified by the write command when, for example, the head 20 has at least a threshold fly height.

Thus, the write inhibiter 302 may dynamically determine and respond to the current head fly height by regulating the length of gaps between data writes and/or the length of writes to allow the head 20 to intermittently cool so that head fly height may be maintained within an acceptable range. The write inhibiter 302 may also effectively regulate the length of the data segment that can be substantially continuously written through the head 20 without pausing to allow head cooling. For example, the write inhibiter 302 may regulate how many contiguous data blocks can be written to one or more data sectors of one or more tracks before writing is inhibited for a defined duration to allow the head 20 to partially cool and increase head fly height before writing is continued.

Accordingly, the write inhibiter 302 may regulate the duty cycle of writing (e.g., lengths of substantially continuously written data segments) to non-writing (e.g., lengths of write inhibit durations) so as to control head temperature and, thereby, fly height. The duty cycle of writing to non-writing may be dynamically regulated as head fly height changes, or may be initiated and/or ceased (i.e., toggled on/off) in response to one or more defined fly height clearance thresholds.

Figure 7:
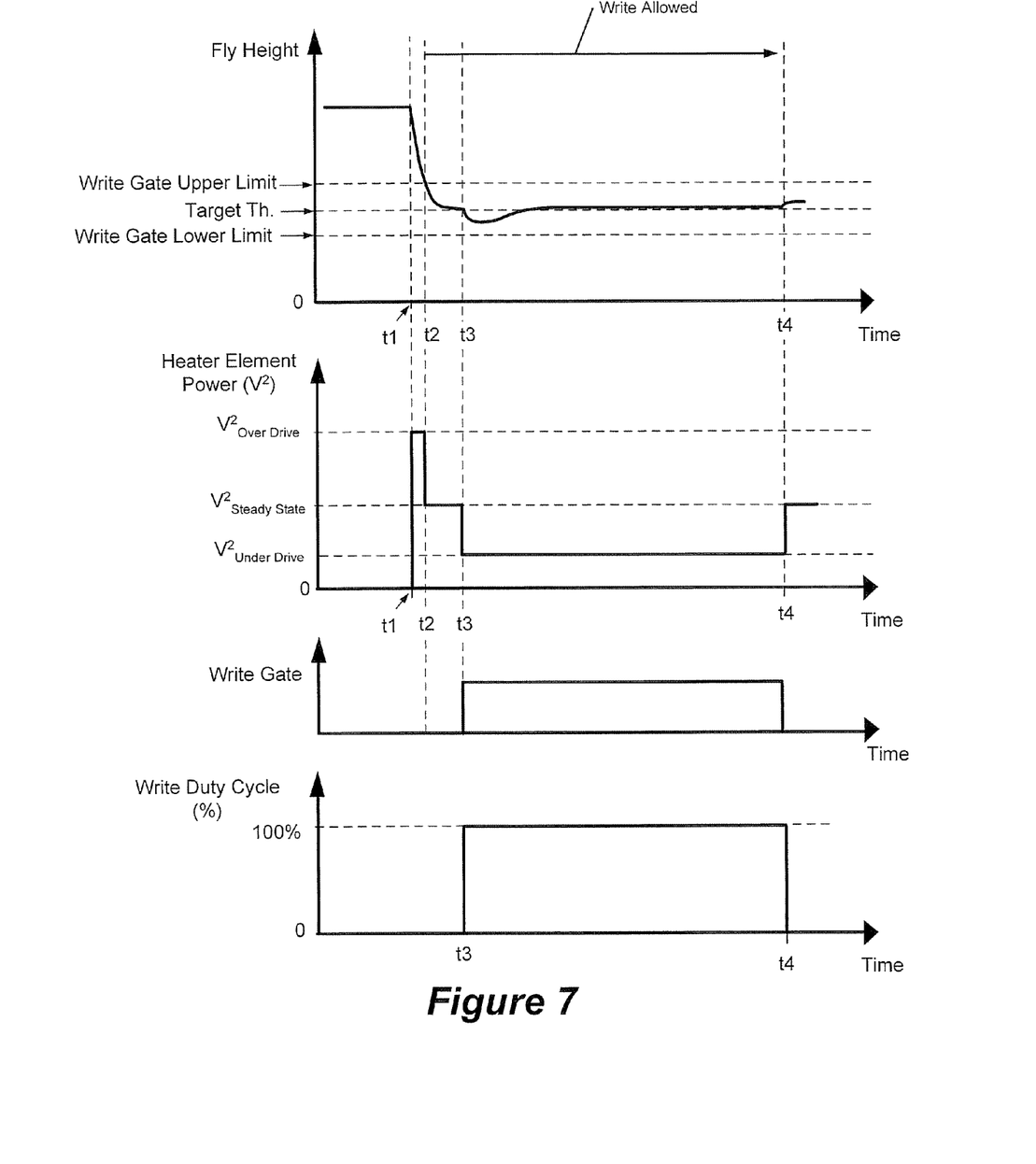
FIG. 7 shows three graphs that illustrate further methods and operation of the fly height controller of FIGS. 3 and 4 for regulating heater element power and write duty cycle to attempt to obtain and maintain head fly height clearance within an acceptable range.
Figure 8:
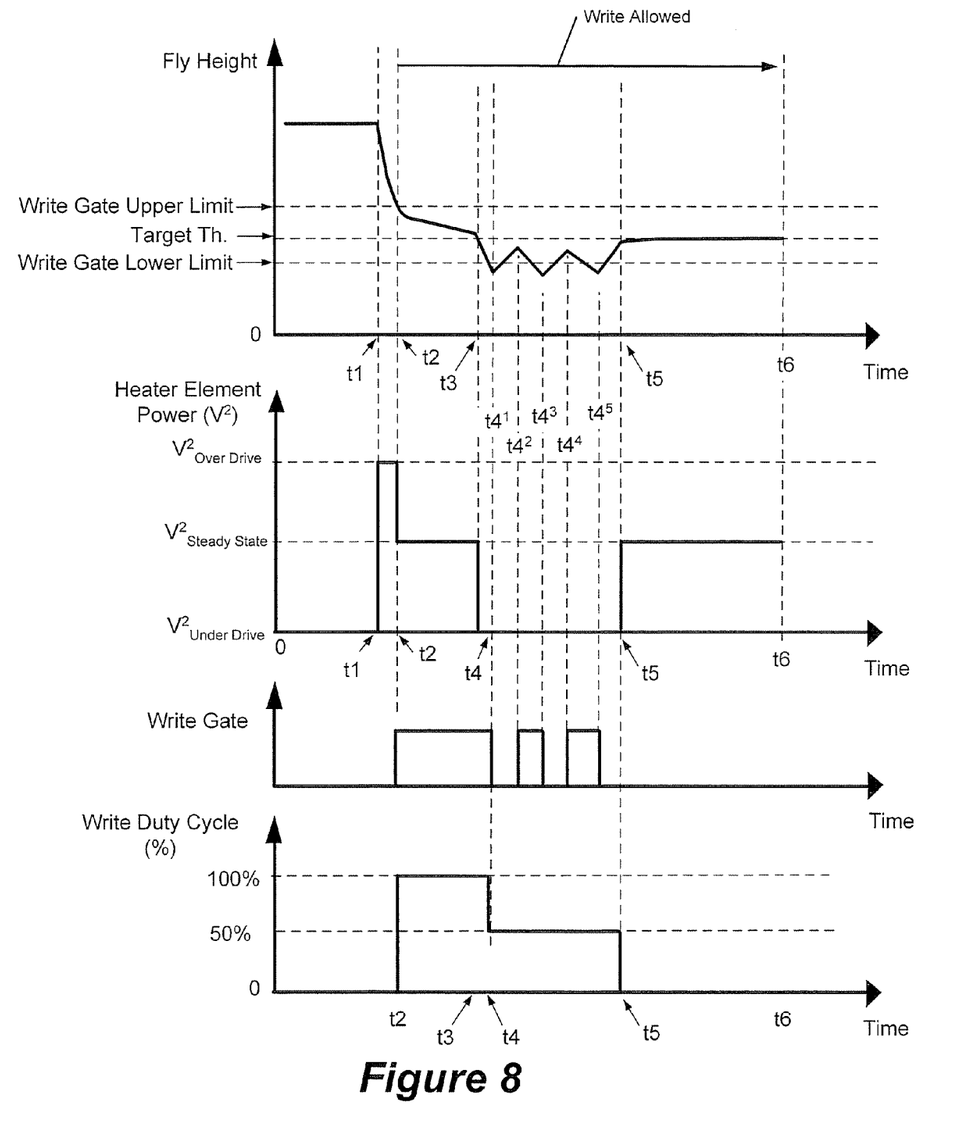
FIG. 8 shows three graphs that illustrate further methods and operation of the fly height controller of FIGS. 3 and 4 for regulating heater element power and write duty cycle to attempt to obtain and maintain head fly height clearance within an acceptable range.
Figure 9:
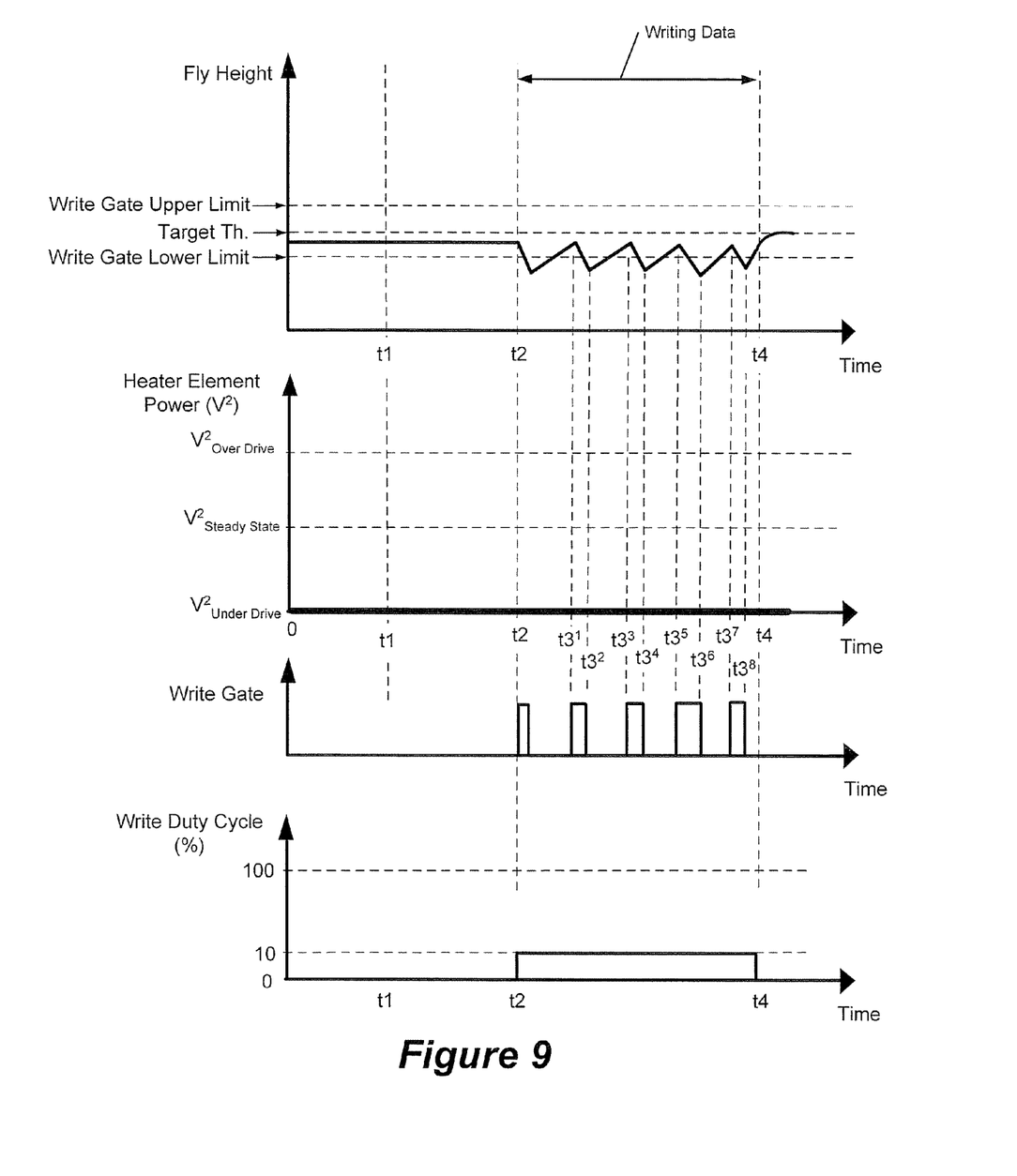
FIG. 9 shows three graphs that illustrate further methods and operation of the fly height controller of FIGS. 3 and 4 for regulating heater element power and write duty cycle to attempt to obtain and maintain head fly height clearance within an acceptable range.

Further exemplary operations that may be carried out by the fly height controller 57 and the data controller 52 to regulate head fly height will now be discussed with reference to FIGS. 7-9. FIGS. 7-9 each show four graphs that illustrate exemplary methods and operation of the fly height controller of FIGS. 3 and 4 for regulating heater element power and write duty cycle to attempt to obtain and maintain head fly height clearance within an acceptable range. It is to be understood that in FIGS. 7-9, the rate of change and the relative magnitudes of the graphs may be exaggerated for purposes of illustration and explanation.

Referring to FIG. 7, when the head 20 is selected for writing at time t1, the head 20 initially has an estimated fly height that is above the write gate upper limit and, consequently, the write inhibiter 302 asserts the write gate inhibit signal 312 to prevent writing and the heater controller 304 supplies the over-drive heater power level ("$V^2_{Over\ Drive}$") to cause the head fly height to rapidly drop toward the target threshold.

In response to the estimated fly height falling below the write gate upper limit at time t2, the heater controller 304 supplies the steady-state ("$V^2_{Steady\ State}$") heater power which causes the head fly height to substantially level-off at the target threshold. Also, at time t2, the write inhibiter deasserts the write gate inhibit signal 312 which allows writing to occur when the head arrives over the address of the data to be written.

At time t3, the write gate is asserted which causes writing to begin through the head 20 onto the disk 34. As data is written, the estimated head fly height falls below the target threshold, which causes the heater controller 304 to reduce the heater element power to the under-drive heater power level ("$V^2_{Under\ Drive}$"), and which causes the fly height to increase back to the target threshold.

Because the head fly height did not fall below the write gate lower limit, the write inhibiter 302 did not reassert the write gate inhibit signal 312 and, therefore, did not decrease the write duty cycle below the unregulated 100% level. If the head fly height had fallen below the write gate lower limit, the write inhibiter 302 would have reasserted the write gate inhibit signal 312, and which would have resulted in write inhibit gaps between written data segments to allow the head 20 to cool between writes.

In response to completion of data writing at time t4, the fly height estimator 300 causes the heater controller 304 to increase the heater element power to the steady-state power level ("$V^2_{Steady\ State}$") to compensate for the cessation of head heating from writing and to drive the head fly height to the target threshold.

With reference now to FIG. 8, another set of graphs are shown in which the initial fly height is substantially lower than in FIG. 7 such that the under drive power is insufficient to fully compensate for write induced protrusion. The graphs in FIG. 8 show that write duty cycle is reduced in response to the head fly height intermittently dropping below the write gate lower limit. Referring to FIG. 8, when the head 20 is selected for writing at time t1, the head 20 initially has an estimated fly height that is above the write gate upper limit and, consequently, the write inhibiter 302 asserts the write gate inhibit signal 312 and the heater controller 304 supplies the over-drive heater power level ("$V^2_{Over\ Drive}$") to cause the head fly height to rapidly drop toward the target threshold.

In response to the estimated fly height falling below the write gate upper limit at time t2, the write inhibiter 302 de-asserts the write gate inhibit signal 312 to allow writing to begin, and the heater controller 304 reduces the heater power level to the steady state level ("$V^2_{Steady\ State}$"). As data is written, the head temperature rapidly increases and the fly height may correspondingly decreases below the target threshold at time t3, and, in response, the heater controller 304 reduces the heater element power to the under-drive level ("$V^2_{Under\ Drive}$"), which, in this example, is zero.

As data is written, the estimated head fly height falls below the write gate lower limit at time $t4^1$ and, in response thereto, the write inhibiter 302 asserts the write gate inhibit signal 312 to suspend writing through the head 20. At time $t4^2$, the head fly height has sufficiently increased above the write gate lower limit that the write inhibiter 302 deasserts the write gate inhibit signal 312 so the writing can resume. At time $t4^3$, the head fly height again decreases sufficiently below the write gate lower limit such that the write inhibiter 302 reasserts the write gate inhibit signal 312 to suspend writing. At time $t4^4$, the head fly height has sufficiently increased above the write gate lower limit that the write inhibiter 302 deasserts the write gate inhibit signal 312 so the writing can resume. At time $t4^5$, the head fly height again decreases sufficiently below the write gate lower such that the write inhibiter 302 reasserts the write gate inhibit signal 312 to suspend writing.

As illustrated, the write duty cycle may therefore be unconstrained at 100% during the timeframe t2 to t4. In sharp contrast, during the timeframe t4 to t5, the write inhibiter 302 can selectively suspend writing to cause an effective write duty cycle of, for example, 50%.

In response to completion of writing of data by time t5, the heater controller 304 increase the heater element power to the steady-state level ("$V^2_{Steady\ State}$") to compensate for the cessation of head heating from writing and drive the head fly height to the target threshold.

With reference now to FIG. 9, another set of graphs are shown in which the head fly height is below the target threshold even with no power applied to FHA heater element 68. This scenario may be due to high disk drive temperature and/or low air pressure. Because the head fly height is below the target threshold, the heater controller 304 maintains the heater element power at the under-drive level ("$V^2_{Under\ Drive}$") which, in this example, is 0.

At time t2, the write inhibiter 302 deasserts the write gate inhibit signal 312 to allow data to be written. As data is written, the head 20 is heated and its fly height falls below the write gate lower limit which results in the write inhibiter 302 asserting the write gate inhibit signal 312 to suspend writing. At time $t3^1$, the head fly height has sufficiently increased above the write gate lower limit that the write inhibiter 302 deasserts the write gate inhibit signal 312 to resume writing. At time $t3^2$, the head fly height again decreases sufficiently below the write gate lower limit such that the write inhibiter 302 reasserts the write gate inhibit signal 312 to suspend writing. At time $t3^3$, the head fly height has sufficiently increased above the write gate lower limit that the write inhibiter 302 deasserts the write gate inhibit signal 312 to resume writing. At time $t3^4$, the head fly height again decreases sufficiently below the write gate lower limit such that the write inhibiter 302 reasserts the write gate inhibit signal 312 to suspend writing. At time $t3^5$, the head fly height has sufficiently increased above the write gate lower limit that the write inhibiter 302 deasserts the write gate inhibit signal 312 to resume writing. At time $t3^6$, the head fly height again decreases sufficiently below the write gate lower limit such that the write inhibiter 302 reasserts the write gate inhibit signal 312 to suspend writing. At time $t3^7$, the head fly height has sufficiently increased above the write gate lower limit that the write inhibiter 302 deasserts the write gate inhibit signal 312 to resume writing. At time $t3^8$, the head fly height again decreases sufficiently below the write gate lower limit such that the write inhibiter 302 reasserts the write gate inhibit signal 312 to suspend writing. The lengths of the gaps between writes, while the write gate inhibit signal 312 is asserted, may each be at least a threshold length which may be determined based on how much time it is expected to take for the head fly height to increase at least a threshold amount above the write gate lower limit such that writing may be allowed to resume.

As illustrated, the write duty cycle may therefore be constrained by the write inhibiter 302 to no more than, for example, 10% during the timeframe t2 to t4.

In extreme conditions, the fly height of the head may be below the write gate lower limit with zero FHA power applied to heater coil 68. Under such circumstances, all writing to HDA 56 is inhibited in order to ensure the integrity and reliability of the head disk interface. In situations in which writing to the magnetic disk is prohibited, data can be written to nonvolatile scratch pad memory 305 or a command can be returned to the host 60 indicating that writing is unsafe.

In the drawings and specification, there have been disclosed typical preferred embodiments and, although specific terms are employed, they are used in a generic and descriptive sense only and not for purposes of limitation, the scope being set forth in the following claims.

What is claimed is:

1. A method of regulating a write command through a read/write head, the method comprising:
   estimating fly height clearance between the head and a data storage media in response to a determination of how much data has been written substantially continuously through the head; and
   regulating a rate at which a write command is carried out in response to the estimated fly height clearance.

2. The method of claim 1, wherein regulating the rate at which the write command is carried out further comprises:
   writing a first data segment of the write command through the head for a first duration and then inhibiting writing through the head for a second duration before writing a second data segment of the write command through the head for a third duration, and regulating length of at least one of the first duration, the second duration, and the third duration in response to the estimated fly height clearance.

3. The method of claim 1, wherein the data storage media comprises a disk, and the rate at which the write command is carried out is regulated at least once per revolution of the disk.

4. The method of claim 1, wherein the media comprises a rotatable disk, and further comprising:
   writing data from a write command temporarily to a nonvolatile semiconductor memory in the disk drive, which is separate from a command buffer memory where the write command is buffered awaiting execution, in response to the estimated fly height clearance being less than a threshold clearance and when writing through the head is inhibited; and
   copying the data from the semiconductor memory to a storage location on the disk addressed by the write command in response to the estimated fly height clearance being greater than the threshold clearance.

5. The method of claim 1, further comprising:
supplying a steady-state level of power to a heater element that heats the head in response to the estimated fly height clearance being between an upper threshold limit and a target threshold.

6. The method of claim 5, further comprising:
supplying an over-drive level of power to the heater element in response to the estimated fly height clearance being greater than the upper threshold limit, wherein the steady-state level of power is less than the over-drive level of power.

7. The method of claim 6, further comprising:
supplying an under-drive level of power to the heater element in response to the estimated fly height clearance being less than the target threshold, wherein the under-drive level of power is less than the steady-state level of power.

8. The method of claim 7, further comprising:
inhibiting writing through the head in response to the estimated fly height clearance being less than a lower threshold limit.

9. The method of claim 1, wherein the fly height is estimated in response to a known relationship between amount of pole tip protrusion induced toward the media and how much data has been written substantially continuously through the head.

10. The method of claim 9, wherein the fly height is estimated in response to a known relationship between amount of pole tip protrusion induced toward the media and air temperature, power level provided to a heater element that heats the head, and how much data has been written substantially continuously through the head.

11. A circuit, comprising:
a controller that estimates fly height clearance between a head and a data storage media in response to a determination of how much data has been written substantially continuously through the head, and regulates a rate at which a write command is carried out through the head in response to the estimated fly height clearance.

12. The circuit of claim 11, wherein the controller supplies a steady-state level of power to a heater element that heats the head in response to the estimated fly height clearance being greater than a target threshold, and supplies an under-drive level of power to the heater element in response to the estimated fly height clearance being less than the target threshold, wherein the steady-state level of power is greater than the under-drive level of power.

13. The circuit of claim 12, wherein the controller supplies an over-drive level of power to the heater element in response to the estimated fly height clearance being greater than an upper threshold limit, wherein the steady-state level of power is less than the over-drive level of power, and the upper threshold limit is greater than the target threshold.

14. A disk drive, comprising:
a rotatable data storage disk;
a read/write head that flies on an air bearing proximate the disk while data is written on the disk; and
a controller that estimates fly height clearance between the head and the disk in response to a determination of how much data has been written substantially continuously through the head and, in response to the estimated fly height clearance being less than a lower threshold clearance, inhibits writing through the head for at least a defined duration.

15. The disk drive of claim 14, wherein the controller supplies a steady-state level of power to a heater element that heats the head in response to the estimated fly height clearance being greater than a target threshold, and supplies an under-drive level of power to the heater element in response to the estimated fly height clearance being less than a target threshold, wherein the steady-state level of power is greater than the under-drive level of power.

16. The disk drive of claim 15, wherein the controller supplies an over-drive level of power to the heater element in response to the estimated fly height clearance being greater than a write gate upper limit, wherein the steady-state level of power is less than the over-drive level of power, and the upper threshold limit is greater than the target threshold.

17. The disk drive of claim 14, wherein:
the controller writes data from a write command temporarily to a non-volatile semiconductor memory in the disk drive, which is separate from a command buffer memory where the write command is buffered awaiting execution, in response to the estimated fly height clearance being less than a lower threshold limit, and copies the data from the semiconductor memory to a storage location on the disk addressed by the write command in response to the estimated fly height clearance being greater than the lower threshold limit.

* * * * *